(12) United States Patent
Scheibelhofer et al.

(10) Patent No.: US 11,327,009 B2
(45) Date of Patent: May 10, 2022

(54) DETERMINATION OF AN IMPAIRMENT OF AN OPTICAL SURFACE FOR IR-SPECTROSCOPY

(71) Applicant: Anton Paar GmbH, Graz (AT)

(72) Inventors: Otto Scheibelhofer, Hainersdorf (AT); Roman Benes, Graz (AT)

(73) Assignee: Anton Paar GmbH, Graz (AT)

( * ) Notice: Subject to any disclaimer, the term of this patent is extended or adjusted under 35 U.S.C. 154(b) by 0 days.

(21) Appl. No.: 16/949,818

(22) Filed: Nov. 16, 2020

(65) Prior Publication Data

US 2021/0164896 A1    Jun. 3, 2021

(30) Foreign Application Priority Data

Nov. 28, 2019  (AT) .............................. A 51039/2019

(51) Int. Cl.
  *G01N 21/35*  (2014.01)
  *G01N 21/3563*  (2014.01)
  *G01N 21/3577*  (2014.01)

(52) U.S. Cl.
  CPC ..... *G01N 21/3563* (2013.01); *G01N 21/3577* (2013.01); *G01N 2021/3595* (2013.01)

(58) Field of Classification Search
  CPC ........... G01N 21/3563; G01N 21/3577; G01N 2021/3595
  See application file for complete search history.

(56) References Cited

U.S. PATENT DOCUMENTS

| | | |
|---|---|---|
| 4,199,838 A | 4/1980 | Simonsson |
| 6,028,663 A | 2/2000 | O'Mongain et al. |
| 8,970,829 B2 | 3/2015 | Caussin De Schneck et al. |
| 9,182,280 B1 | 11/2015 | Gardner et al. |

| | | | |
|---|---|---|---|
| 2002/0060020 A1* | 5/2002 | Irwin | G01N 21/552 162/198 |

(Continued)

FOREIGN PATENT DOCUMENTS

| | | |
|---|---|---|
| EP | 1486771 A1 | 12/2004 |
| EP | 1914538 A1 | 4/2008 |

(Continued)

OTHER PUBLICATIONS

Scheibelhofer, O. et al.; Automatic Correction for Window Fouling of near Infrared Probes in Fuidised Systems; Journal of Near Infrared Spectroscopy; vol. 22, No. 3; Jul. 2014; pp. 229-238.

(Continued)

*Primary Examiner* — Hugh Maupin
(74) *Attorney, Agent, or Firm* — Robert A. Blaha; Smith Tempel Blaha LLC (57) ABSTRACT

A device is provided for IR-spectroscopy and for determining an impairment of a surface which is exposed to measuring radiation during the IR-spectroscopy. The device includes a radiation source to generate the measuring radiation a detector and a sample receptacle for receiving a sample. The sample receptacle is at least partially delimited by the surface. The detector measures radiation after interaction with the sample. The device is configured to measure an IR-reference spectrum of a reference sample which is received in the sample receptacle, evaluate the reference spectrum, determine an indicator of the impairment, wherein evaluating encompasses an integration of a quantity which is based on the reference spectrum over a predetermined integration spectral range, wherein the indicator is determined dependently on a value of the integration.

18 Claims, 6 Drawing Sheets

(56) References Cited

U.S. PATENT DOCUMENTS

| | | |
|---|---|---|
| 2003/0179368 A1 | 9/2003 | Li et al. |
| 2003/0232448 A1 | 12/2003 | Shelley et al. |
| 2004/0056196 A1 | 3/2004 | Koshida et al. |
| 2004/0099806 A1 | 5/2004 | Shelley et al. |
| 2010/0277727 A1 | 11/2010 | Schlaminger |
| 2011/0249911 A1* | 10/2011 | Determan ............ G06K 9/0014 382/282 |
| 2011/0307187 A1* | 12/2011 | Watari ................. G01N 21/359 702/32 |
| 2013/0037719 A1 | 2/2013 | Melling et al. |
| 2016/0178435 A1 | 6/2016 | Indo et al. |
| 2016/0231234 A1 | 8/2016 | Hensley |
| 2019/0003952 A1 | 1/2019 | Shah et al. |

FOREIGN PATENT DOCUMENTS

| | | | |
|---|---|---|---|
| EP | 2 426 480 A2 | 3/2012 | |
| EP | 2 629 093 A1 | 8/2013 | |
| WO | 2007126612 A2 | 11/2007 | |
| WO | 2017021611 A1 | 2/2017 | |

OTHER PUBLICATIONS

Goode, Kylee R. et al.; Fouling and Cleaning Studies in the Food and Beverage Industry Classified by Cleaning Type Comprehensive Reviews in Food Science and Food Safety; vol. 12. 2013; pp. 121-143.

Riblet, P.; Extended European Search Report in Application No. 20 207 138.7; pp. 1-10; Apr. 29, 2021; European Patent Office; 80298, Munich, Germany.

Ruhland, K. et al.; "Investigation of the chemical changes during thermal treatment of polyacrylonitrile and 15N-labelled polyacrylonitrile by means of in-situ FTIR and 15N Nmr spectroscopy"; Polymer Degradation and Stability; 2017; Elsevier Ltd.

* cited by examiner

DETERMINATION OF AN IMPAIRMENT OF AN OPTICAL SURFACE FOR IR-SPECTROSCOPY

CROSS-REFERENCE TO RELATED APPLICATIONS

This application claims the benefit of the filing date of the Austrian Patent Application file no. A51039/2019 filed 28 Nov. 2019, the disclosure of which is hereby incorporated herein by reference.

TECHNICAL FIELD

Embodiments of the present invention relate to a device for IR-spectroscopy and for determining an impairment of a surface which is exposed to measuring radiation during the IR-spectroscopy. Embodiments of the present invention further relate to a method of determining an impairment of the surface which is exposed to measuring radiation during the IR-spectroscopy, and still further relate to a computer program-product with program instructions which, when being executed by a processor, execute the method.

TECHNOLOGICAL BACKGROUND

By an infrared-spectrometer, conventional infrared-active substances can be analyzed by means of an absorption/transmission measurement. The irradiated measuring radiation excites rotational or vibrational modes of the molecules which are contained in the sample and thereby, at characteristic wavelength, attenuations of the irradiated radiation are observed, e.g. in the transmission or in the reflection. The Fourier transformation-infrared spectroscopy (FTIR) is a special form of infrared spectroscopy, wherein the data over a broad spectral range can be recorded within a relatively short time period.

Document WO 2007/126612 A2 discloses a contamination monitoring for use with an optical metrology instrument, in order to minimize absorbing substances within the light path of the metrology instrument and to minimize the generation of contaminants on surfaces of optical elements as well. The optical metrology instrument may e.g. work in the ultraviolet-wavelength range. A reference sample is measured prior and after a measurement of a test sample and the both reference measurements are compared to determine contaminants or to determine a contamination.

Document US 2016/231234 A1 discloses a method for confirming a cleaning by a near infrared-spectrophotometer or for measuring a cleaning effectivity. Prior and after a cleaning, data are respectively recorded and compared to generate a contamination characteristic.

Document U.S. Pat. No. 9,182,280 B1 discloses a method for reducing the frequency to record background spectra in FTIR- or FTIR-ATR-spectroscopy. When a previously existing reference spectrum is available, a current reference spectrum is recorded before a sample is measured. The current reference spectrum is compared with the previously existing reference spectrum for determining if there are non-conformities in between. If there are non-conformities, these are removed.

Document US 2019/003952 A1 discloses particle detection methods and systems, in particular a flow cytometer. Furthermore, methods for determining a degree of contamination in a flow cell are disclosed. A flow cytometer in its entire construction and the used physical methods and effects is highly different from an infrared spectrometer.

Document US 2010/277727 A1 discloses a method for detecting contaminants in an optical measuring cuvette of a spectrophotometer. A measured reference spectrum is compared with a known target spectrum which is associated with the measuring cuvette, and it is automatically decided if a contamination is present in the measuring cuvette, namely as a function of predetermined threshold values of comparison parameters.

Document US 2016/178435 A1 discloses a method of diagnosing optical spectrometers of bore hole tools. Optical data of a spectrometer of a bore hole tool are recorded and the light scattering and the optical drift for the spectrometer are estimated and determined, respectively, based on the selected data. The quantified baseline-drift is estimated with respect to the impact on the measurement and the impact is compared with a threshold value to diagnose the state of the spectrometer.

Document U.S. Pat. No. 6,028,663 A discloses a photometric analysis of water suspensions, wherein light which is not absorbed and scattered back is eliminated in a spectrometer to enable a real-time analysis of a non-concentrated water suspension without any treatment of the water.

Conventional methods for determining a pollution of a relevant surface in a measuring light path are elaborate and frequently require at least two measurements of a reference sample. Therefore, conventional methods and systems are complex and time-consuming. Other systems and methods of prior art invite a user in periodical intervals to clean a measuring cell, for example. This invitation is performed without having previously determined the degree of the contamination of the cell. Thus, a cleaning may be performed too often or in other cases too rarely as well, with the disadvantages of an increased time-effort and a degraded measurement and more unreliable measuring results, respectively.

SUMMARY

Thus, there may be a need to propose a device and a method, respectively, for determining an impairment (in particular a pollution) of a surface which is exposed to measuring radiation during the IR-spectroscopy, wherein the device and the method, respectively, are simplified with respect to the prior art and the method may be performed in a shorter time period. There may be further a need to simplify procedures of determining the intactness of a measuring cell and a relevant surface, respectively, and in particular to determine, by means of a simple method, a degree of pollution of the measuring cell and a relevant optical surface, respectively.

The subject matters of the independent claims are provided which are directed to a device and a method, respectively, for IR-spectroscopy and for determining an impairment of a surface which is exposed to measuring radiation during the IR-spectroscopy. The dependent claims specify particular embodiments of the present invention.

According to an embodiment of the present invention, a device for IR-spectroscopy and for determining an impairment (e.g. a pollution and/or a damage) of a surface (e.g. a glass surface) is provided, which surface is exposed to measuring radiation (e.g. interacts with it) during the IR-spectroscopy, wherein the device comprises: a radiation source to generate the measuring radiation; a sample receptacle for receiving a (e.g. reference) sample, wherein the sample receptacle is at least partially delimited by the surface; a detector for detecting measuring radiation after an interaction with the sample (and the surface). The device is configured: to measure an IR-reference spectrum of a reference sample (which is e.g. in contact with the surface) which is received in the sample receptacle; to evaluate the reference spectrum (e.g. according to a pregiven algorithm), to determine an indicator of the impairment, wherein evaluating encompasses an integration of a quantity which is based on the reference spectrum over a predetermined integration spectral range, wherein the indicator is determined dependently on a value of the integration.

Overview of Embodiments

The device may be adapted for different types of infrared spectroscopy. The device may e.g. be adapted for transmission-IR-spectroscopy or for ATR-IR-spectroscopy. The radiation source is configured to generate and to emit infrared radiation. The measuring radiation may e.g. encompass wavelengths in a range between 700 nm and 100 µm. Depending on the application (sample to be examined), the wavelength range in which the radiation source emits measuring radiation may also be reduced, e.g. may be between 1.25 and 50 µm. The radiation source may e.g. be formed by a silicon carbide element which is heated to a certain temperature, for example between 800 K and 1500 Kelvin, in particular approximately 1200 Kelvin. The radiation source may generate and emit e.g. radiation of wavelengths between 2 and 25 µm (wave numbers between 5000-400 $cm^{-1}$).

The detector may e.g. be configured for detecting the intensity of the measuring radiation after the interaction with the sample in a spectral range between 1.6 and 15 µm. The detector may e.g. be configured as a point detector or a photodiode, respectively. The detector may detect the part of the measuring radiation with respect to the intensity, which is not absorbed by the sample. For example, the detector may be configured as a DTGS-type-detector (deuterated triglycine sulfate detector).

The sample to be examined and/or the reference sample may e.g. be liquid. In the interaction of the IR-measuring radiation with the sample, rotational or vibrational modes within the sample can be excited, e.g. symmetrical stretch modes, asymmetrical stretch modes, shearing motions in a plane, rolling motions in a plane, or the like.

In the FTIR-spectroscopy, a Fourier transformation is applied to the recorded raw data to convert an interferogram to a spectrum. When the device is configured as FTIR-spectrometer, the device thus also encompasses an interferometer. The interferometer may be configured to split incident light into two light portions which are modified and brought to interference. The interference patterns may subsequently be recorded as interferogram.

If FTIR-spectroscopy is applied, the interferometer may e.g. be configured as a known Michelson-interferometer. A half of the split measuring light and the split measuring radiation, respectively, is directed to a static mirror and the other half is e.g. directed to a moving mirror which is performing a motion which is oscillating perpendicularly to its plane. The beams which are reflected from the two different mirrors are recombined and are either guided through the sample or are reflected in the ATR-spectroscopy under interaction with the sample by attenuated total reflection. The detector may detect an interferogram which is converted by the Fourier transformation to a spectrum (intensity in dependence on the wavelength and wave number, respectively).

The sample receptacle may e.g. be configured as a transmission measuring cell or as an ATR- (attenuated total reflection) cell.

In the case of transmission-IR-spectroscopy, the sample receptacle may be formed by a transmission measuring cell. The transmission cell may e.g. consist of a material which is transparent for the IR-radiation, e.g. inorganic salts may be used (e.g. ZnSe, KBr, $CaF_2$, NaCl, etc.). In this case, the (liquid) sample is filled in the transmission cell and is thus surrounded by the IR-transparent cell material. The IR-measuring radiation is sent through the measuring cell. Thereby, the sample interacts with the measuring radiation and absorbs a part of the measuring radiation.

When the device is configured for ATR-IR-spectroscopy, the sample receptacle may be formed by an ATR-measuring cell. The IR-measuring radiation is propagated through e.g. a solid transparent crystal which is in contact with the sample to be examined. Subsequently, the measuring radiation (from inside of the crystal) impinges a surface which is delimiting the crystal between the sample and the crystal and is reflected, wherein however a part of the measuring radiation penetrates some micrometers in the region of the sample and thus may also interact with the sample. The part of the measuring radiation which penetrates into the sample region is also denoted as evanescent wave. Also, the radiation which is emitted or absorbed by the sample by the interaction with the sample is thus detected by the detector. According to a special embodiment of the present invention, the measuring radiation is reflected multiple times within the solid transparent crystal and thus also interacts multiple times with the sample to increase the detected intensity differences (multiple bounce ATR). For example, between 10 and 15 reflections may occur within the ATR crystal. In other embodiments, between 2 and 10 reflections may occur.

The surface may, e.g. in the case of transmission-IR-spectroscopy, be and encompass, respectively, the inner and/or an outer surface of a transmission cell. If ATR-IR-spectroscopy is performed, the surface may also be a surface of a (ATR-) crystal in which the measuring radiation is coupled and which is in contact with the sample.

Special embodiments of the present invention are configured to determine in particular a pollution of the surface, e.g. with organic and/or inorganic molecules such as polysaccharides, polyphenols (in particular tannins), flavonoids (in particular anthocyanins), sodium- and potassium tartrate. The pollution substances which are adsorbed or deposited on the surface may themselves deliver characteristic IR-spectra, which according to embodiments of the present invention can be considered and used, respectively, for determining the pollution and in particular also for determining the degree of pollution.

In order to measure the IR-reference spectrum, the measuring radiation is directed to the sample within the sample receptacle and the transmitted and reflected, respectively, measuring radiation after the interaction with the sample is detected and registered, respectively, by the detector with respect to the intensity (resolved according to wavelength). The reference spectrum may e.g. be stored in a digital form and may be evaluated by an evaluation unit and a processor, respectively, e.g. according to a mathematical algorithm, in particular to determine the indicator of a pollution, further in particular an indicator of a degree of pollution.

The evaluation of the recorded spectra may be performed by an evaluation unit (e.g. encompassing a computer and a suitable evaluation program, respectively).

Wavelength and wave number, i.e. reciprocal value of the wavelength, are alternative possibilities to define a certain point or region of the electromagnetic spectrum.

The predetermined integration spectral range is in the IR-spectral range, may have a width between (expressed as wave numbers) 300 and 800 cm$^{-1}$, in particular 400 and 600 cm$^{-1}$ and/or may have a start point between 800 and 1000 cm$^{-1}$ and/or may have an end point between 1300 and 1700 cm$^{-1}$.

The predetermined integration spectral range may be adjusted depending on the application, in particular depending on expected contamination constituents or contamination molecules which may e.g. comprise a characteristic absorption in specific wavelength ranges. The IR-reference spectrum may be recorded exactly in this integration spectral range (or in a slightly extended spectral range, e.g. up to approximately a wafer number of 1900 cm$^{-1}$), without containing intensities at wavelengths which are not within the integration spectral range. Therefore, the IR-reference spectrum can also be recorded in a short time period. The integration may be numerically performed within the evaluation unit and the computer, respectively, wherein e.g. the wavelength sampling rate of the reference spectrum can be used as step size. Depending on the value of the integration, the indicator for the impairment is determined, the indicator in particular may quantitatively indicate a degree of pollution.

Thus, a simple method for determining the indicator of the impairment is provided, which may be implemented in the device in a simple manner. When the indicator is indicated to a user, it may also be avoided that the IR-spectroscopy is performed with a polluted and impaired, respectively, surface, in particular of the measuring cell. In other cases, according to the determined indicator, an unnecessary cleaning of the surface, in particular the measuring cell, can be avoided in order to avoid longer downtimes.

According to an embodiment of the present invention, the predetermined integration spectral range is between 800 cm$^{-1}$ and 2000 cm$^{-1}$, in particular between 900 cm$^{-1}$ and 1500 cm$^{-1}$, wherein the indicator quantitatively indicates a degree of a pollution of the surface. The integration spectral range may be selected depending on the application, in particular in dependence of expected contamination molecules and/or of an expected possible damage of the surface. The damage of the surface may e.g. be given by a scratch.

According to an embodiment of the present invention, the reference spectrum encompasses a specification: of a measured intensity of the (total) reflection of measuring radiation from the surface (inclusively a radiation which is emitted from the reference sample which is evanescent due to being incident into the sample) or a measured intensity of the transmission of measuring radiation through the surface inclusively the reference sample for different wave numbers and wavelengths, respectively, wherein the measuring radiation encompasses wavelengths in a range from 2 to 12.5 µm. Thus, transmission-IR-spectroscopy and ATR-IR-spectroscopy are supported.

According to an embodiment of the present invention, evaluating encompasses: normalizing the reference spectrum to obtain a normalized reference spectrum, wherein for this purpose the measured reference spectrum is divided by the intensity at a predetermined wave number and/or multiplied by a predetermined factor; and/or logarithmizing the, in particular normalized, reference spectrum, to obtain a logarithmized normalized reference spectrum.

The predetermined wave number may be determined in dependency of expected contaminations and expected contamination molecules, respectively. The predetermined wave number in particular may be determined such that an intensity which is detected at this predetermined wave number is influenced and changed, respectively, only to a small extent or not at all by contaminations of these molecules which are actually present on the surface. The predetermined wave number may be between 880 and 950 cm$^{-1}$, for example, in particular approximately at 920 cm$^{-1}$. For this wavelength and wave number, respectively, no influence on the intensity is expected by contaminants of an expected type which are possibly present on the surface. Logarithmizing may be performed according to the Lambert-Beer-law, to therefore obtain the logarithmized normalized reference spectrum which is proportional to a concentration of the contaminations to be determined.

According to an embodiment of the present invention, evaluating further encompasses: temperature compensating the, in particular logarithmized normalized, reference spectrum to obtain a temperature compensated reference spectrum, wherein the quantity which is based on the reference spectrum is proportional to the temperature compensated reference spectrum.

The temperature compensating can be understood as a baseline correction to reduce and eliminate, respectively, the dependency of the reference spectrum on the measuring temperature. Therefore, it is enabled e.g. to measure the reference spectrum at different temperatures which as such do not have to be previously explicitly adjusted and registered, respectively. A temperature dependency of the reference spectrum may be reduced and eliminated, respectively, by the temperature compensating in an algorithmic manner.

According to an embodiment of the present invention, temperature compensating encompasses subtracting a function which is linear in the wave number from the, in particular logarithmized normalized, reference spectrum, wherein in particular two parameters which are defining the linear function are defined by equalizing the, in particular logarithmized normalized, reference spectrum with the linear function at a first and at a second predetermined wave number.

The linear function may e.g. comprise a positive slope. The slope and an axis intercept may be determined by equalizing the reference spectrum with the linear function at the first and at the second predetermined wave number. The first and the second predetermined wave number may be selected in dependency of expected contamination types and contamination molecules, respectively. In particular, the first and/or the second predetermined wave number may be determined such that an impact of a (initially unknown) contamination on the detected intensity of the measuring radiation is small and negligible, respectively, at the first and/or the second predetermined wave number. Moreover, the first and/or the second predetermined wave number are determined such that they are between the rotation bands of water vapor and thus no impact by atmospheric water vapor occurs.

In general, it is expected that the recorded IR-reference spectrum is depending on the measuring temperature. However, by the temperature compensating, this dependency can be compensated and eliminated, respectively. Determining the impairment of the surface may thus be performed at different temperatures, in particular without actually knowing and/or measuring and recording, respectively, the measuring temperature.

According to an embodiment of the present invention, the first predetermined wave number is between 870 cm$^{-1}$ and 970 cm$^{-1}$, and/or wherein the second predetermined wave number is between 1790 cm$^{-1}$ and 1900 cm$^{-1}$. Other values are possible.

According to an embodiment of the present invention, evaluating encompasses normalizing the value of the integration to obtain a normalized integration value, wherein the indicator is determined based on the normalized integration value. By normalizing, it can be ensured that the normalized integration value is always larger than zero. Thus, an interpretation of the indicator is simplified.

According to an embodiment of the present invention, the normalized integration value S$^o$ is calculated according to: S$^o$=(S-S$_{min}$)/(S$_{max}$-S$_{min}$), wherein S is the value of the integration and S$_{min}$ and S$_{max}$ are predetermined quantities.

The values S$_{min}$, S$_{max}$ can be empirically determined, e.g. can be assumed as S$_{max}$=-60 and S$_{min}$=-165. Other values are possible. The parameters S$_{max}$, S$_{min}$ may be determined by determining the actual contamination of the surface by an independent method and by correspondingly adapting the factors S$_{max}$, S$_{min}$, such that the determined normalized integration value is reflecting the actual contamination which is measured by other methods.

According to an embodiment of the present invention, evaluating encompasses cutting (e.g. severing and/or delimiting) the normalized integration value between the values zero and one, to obtain the indicator. By cutting and severing, respectively, it is ensured that a resulting indicator is between the values 0 and 1, which can effectuate a simple interpretation and a clear reception for a user. The pollution may be the higher, the higher the cut normalized integration value is.

According to an embodiment of the present invention, the device is configured to perform ATR-IR-spectroscopy, in particular ATR-FTIR-spectroscopy, wherein the surface encompasses a surface of the at least one ATR-crystal and/or an ATR-cell which is in contact with the reference sample. The ATR-crystal has a higher optical density than the (liquid) sample in contact with the surface. Thus, a total reflection of the measuring light which is propagating within the ATR-crystal at the inner surface of the crystal is possible.

According to an embodiment of the present invention, the device is configured to perform a transmission-IR-spectroscopy, in particular transmission-FTIR-spectroscopy, wherein the surface encompasses an inner and/or an outer surface of a measuring cell in which the reference sample is received. Thus, different variants of IR-spectroscopy are supported.

According to an embodiment of the present invention, the device further comprises a display device which is configured to indicate the indicator in an optical and/or acoustical manner. The display device may e.g. encompass a display screen which may also provide a graphical user interface for controlling the device. The indicator may encompass characters or other optical symbols, for example different colors (e.g. from green to red) or shapes. If a degree of pollution is determined to be larger than or equal to a threshold value (e.g. 1), an alarm may be output, for example by an acoustic whistling sound and/or an optical flashing, to invite the user to perform a cleaning and maintenance, respectively, of the surface (e.g. of the measuring cell).

According to an embodiment of the present invention, the device is further configured, by means of the display device, to indicate to a user that a maintenance shall be performed, if the value of the indicator exceeds a threshold value. The maintenance may e.g. be specified as a cleaning. Depending on the certain degree of pollution, also additional hints to the type of the cleaning and the type of the maintenance, respectively, may be given, e.g. to perform a cleaning procedure multiple times, if the indicator is above a certain threshold value, or to apply special cleaning agents or methods. For example, the cleaning has to be recommended only once, if the indicator is below another threshold value.

According to an embodiment of the present invention, the reference sample encompasses water, in particular high-purity water, or is high-purity water. Admittedly, also water comprises a characteristic IR-spectrum. However, in the predetermined integration wave range, no significant absorption peaks are observed. In other embodiments, another substance may be used as reference sample.

According to embodiments of the present invention, the device is configured to determine the indicator without measuring and/or without a comparison with a previous reference spectrum. Thus, the determination and therefore the complexity of the device can be simplified.

According to an embodiment of the present invention, the device further comprises a processor and an electronic memory (e.g. RAM, hard disk, memory stick, CD) which can be accessed by the processor and in which a computer program product with program instructions is stored, wherein the processor is configured to execute the program instructions to (in particular measure and) evaluate the reference spectrum to determine the indicator of the impairment. Thus, the device may be implemented by conventional available components.

It should be understood, that features which are mentioned, described, explained and provided, respectively, individually or in any combination in the context of a device for IR-spectroscopy and for determining an impairment of a surface, are also individually or in any combination applicable to a method for determining an impairment of a surface which is exposed to measuring radiation during the IR-spectroscopy, according to embodiments of the present invention and vice versa.

According to an embodiment of the present invention, a method for determining an impairment of the surface is provided, which is exposed to measuring radiation during the IR-spectroscopy. The method comprises: measuring an IR-reference spectrum of a reference sample; evaluating the reference spectrum to determine an indicator of the impairment, wherein evaluating encompasses an integration of a quantity which is based on the reference spectrum over a predetermined integration spectral range, wherein the indicator is determined dependently on a value of the integration.

The above described device may be configured to execute the method.

According to an embodiment of the present invention, it is further provided a computer program product with program instructions which are configured, when being executed by a processor, to control or to execute the method according to the previous claim. The computer program product may be stored e.g. on a storage medium, such as CD, DVD, memory stick, or on a computer server which can be accessed via a communication network, e.g. internet.

BRIEF DESCRIPTION OF THE DRAWINGS

Embodiments of the present invention are described in the following with reference to the accompanying figures. The invention is not limited to the illustrated or described embodiments.

DETAILED DESCRIPTION OF THE ILLUSTRATED EMBODIMENTS

The illustrations in the drawings are schematically presented. In different drawings, similar or identical elements are provided with the same reference signs.

Figure 1:
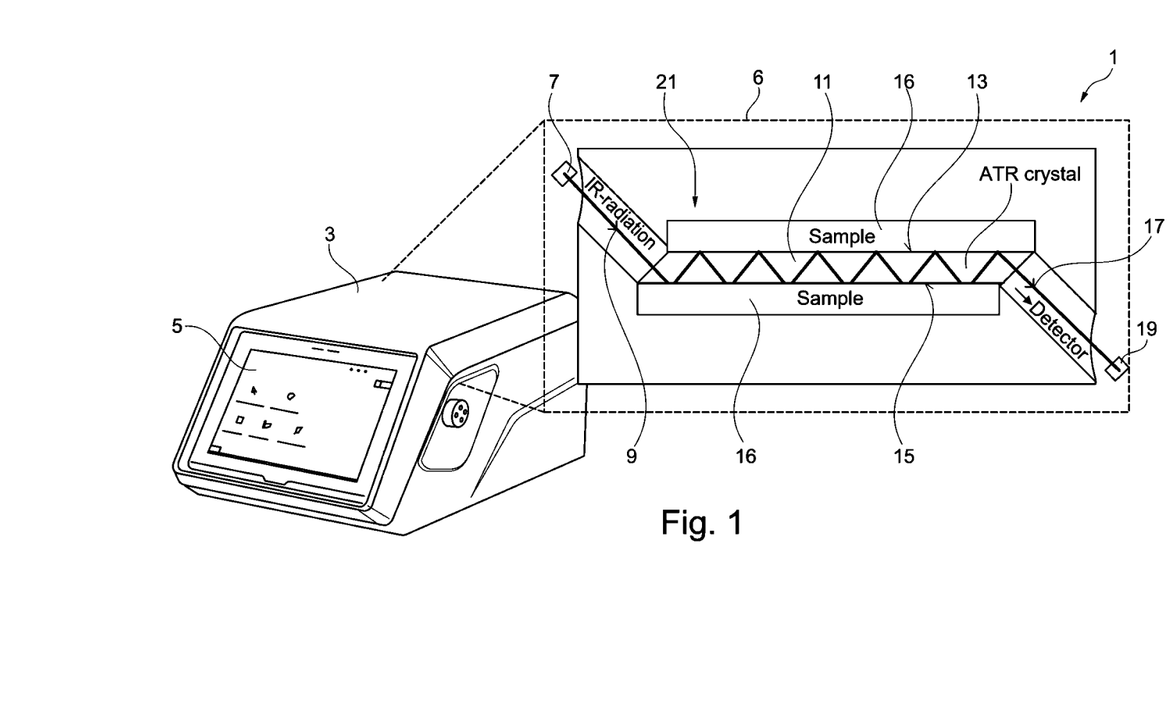
FIG. 1 schematically illustrates a device for IR-spectroscopy and for determining an impairment of a surface according to an embodiment of the present invention with an enlarged view of a scheme of the IR-measurement.

The device 1 for IR-spectroscopy which is schematically illustrated in FIG. 1 shows a device housing 3 with a graphical user interface on a display screen 5 to enable a user to operate and control, respectively, the device 1. In an enlarged view 6, parts of the interior of the device 1 are schematically illustrated. The device 1 encompasses a radiation source 7 to generate measuring radiation 9. In the embodiment which is illustrated in FIG. 1, the device is configured as ATR-FTIR-spectrometer. The device 1 encompasses an ATR-crystal 11 which comprises a surface 13, 15 which is in contact with a sample 16. The measuring radiation 9 is coupled into the ATR-crystal 11 and is totally reflected at the surfaces 13, 15, wherein an evanescent electromagnetic wave also penetrates a certain depth into the sample 16 and can interact with it. After in total 12 reflections at the surfaces 13, 15, the measuring radiation 17 which has interacted with the sample 16 is coupled out of the ATR-crystal 11 and is directed to a detector 19 which registers the intensity of the measuring radiation 17 after the interaction with the sample 15.

The device encompasses a processor which is not explicitly illustrated in FIG. 1, and an electronic memory on which a computer program is stored. The processor is configured to execute the computer program whilst measuring an IR-reference spectrum of a reference sample, in particular high-purity water, which is received in a sample receptacle 21. Furthermore, the processor is configured to evaluate the reference spectrum to determine an indicator of the impairment. The evaluation of the reference spectrum encompasses an integration of a quantity which is based on the reference spectrum over a predetermined indication range, as explained in detail below.

Figure 2A:
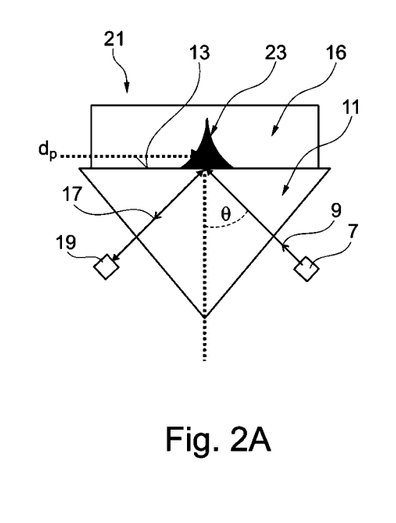
FIGS. 2A and 2B schematically Illustrate the measuring process during the ATR-IR-spectroscopy for measuring a sample and for measuring an IR-reference spectrum, respectively.
Figure 2B:
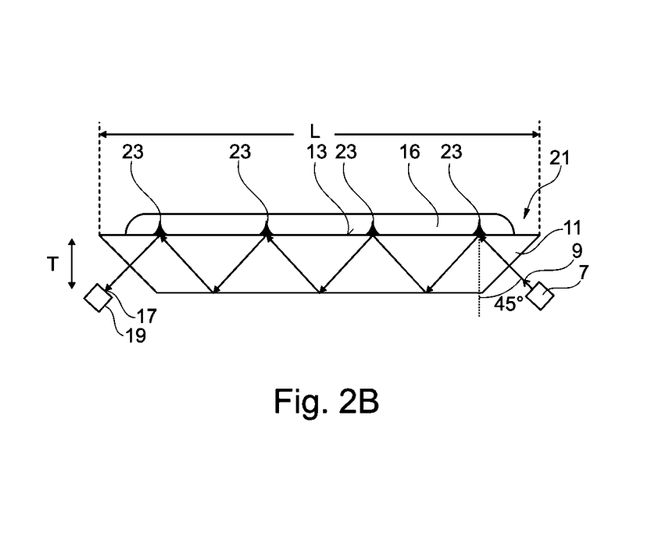

FIGS. 2A and 2B once again illustrate the measuring process for two different embodiments. FIG. 2A shows a measurement with a single reflection (single bounce), while FIG. 2B illustrates a measurement with a multiple reflection (multi-bounce). The incident measuring radiation 9 is coupled into the ATR-crystal 11 and is directed to the sample 16 which is contained in the sample receptacle 21, which sample is in contact with the surface 13 of the ATR-crystal 11. An evanescent electromagnetic wave 23, despite the total reflection at the surface 13, penetrates some micrometers into the sample receptacle 21 and thus also interacts with the sample 16. The measuring radiation 17 is measured by the detector 19 after the interaction with the sample 16.

Figure 3:
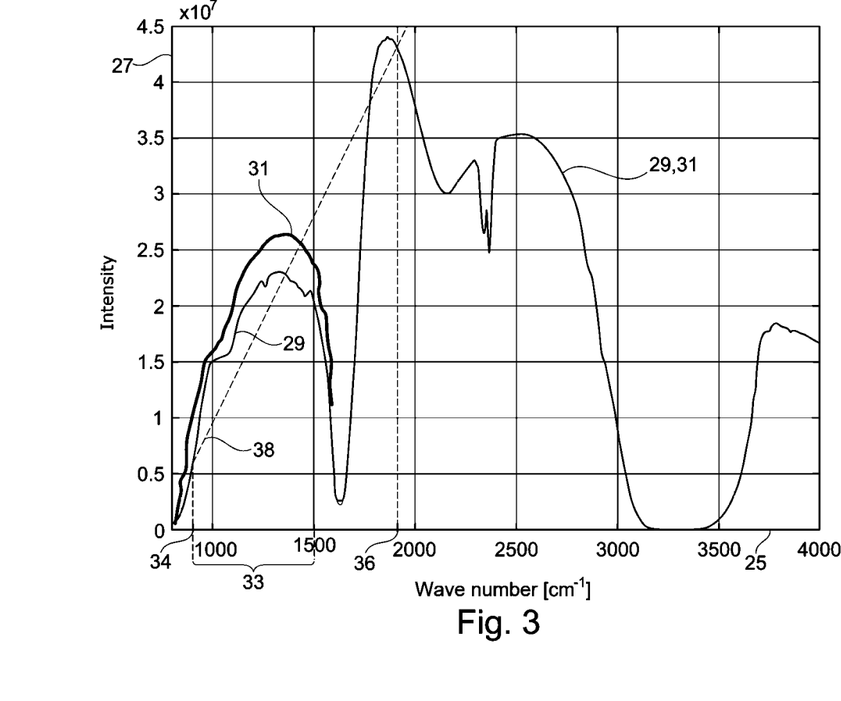
FIG. 3 schematically shows reference spectra at different degrees of pollution of a surface which is exposed to a measuring radiation.

FIG. 3 exemplifies different reference spectra which are recorded according to a method by the device which is illustrated in FIGS. 1, 2A, 2B, to determine an indicator for the impairment of a surface (e.g. surfaces 13, 15). In a coordinate system with an abscissa 25 which is indicating the wave number, and an ordinate 27 which is indicating the intensity, spectra 29 and 31, respectively, of high-purity water are illustrated as they have been measured by the device 1 for different degrees of pollution of the surfaces 13, 15. When recording the spectrum 31, the surfaces 13 and/or 15 were more polluted than when recording the spectrum 29, wherein in particular the surfaces were completely clean.

In FIG. 3, a predetermined integration spectral range 33 is illustrated, over which respectively normalized, logarithmized and temperature compensated reference spectra 31, 29 are integrated, wherein the indicator of the impairment of the surface is determined dependently on a value of the integration. As can be seen in FIG. 3, the spectra 31, 29 in particular in the predetermined integration spectral range 33, highly differ from each other, while they are almost not distinguishable in other spectral ranges and for other wavelengths, respectively, and wave numbers, respectively. Therefore, the intensity within this predetermined integration spectral range 33 is indicative for the presence of a pollution at the surfaces 13, 15.

In FIG. 3, also the first predetermined wave number 34, namely 920 cm$^{-1}$, and the second predetermined wave number 36, namely 1844 cm$^{-1}$, are indicated. Additionally, the course of the linear function is indicated as a straight line which runs through the points I (920 cm$^{-1}$) and I (1844 cm$^{-1}$), respectively.

It should be understood, that the predetermined wave numbers 34, 36 and/or the predetermined integration spectral range 33 may be depending on the specific application and are illustratively applicable e.g. for alcoholic beverage samples, such as beer, wine. For other substances (e.g. fuel, oil), other values can be applied.

Figure 4:
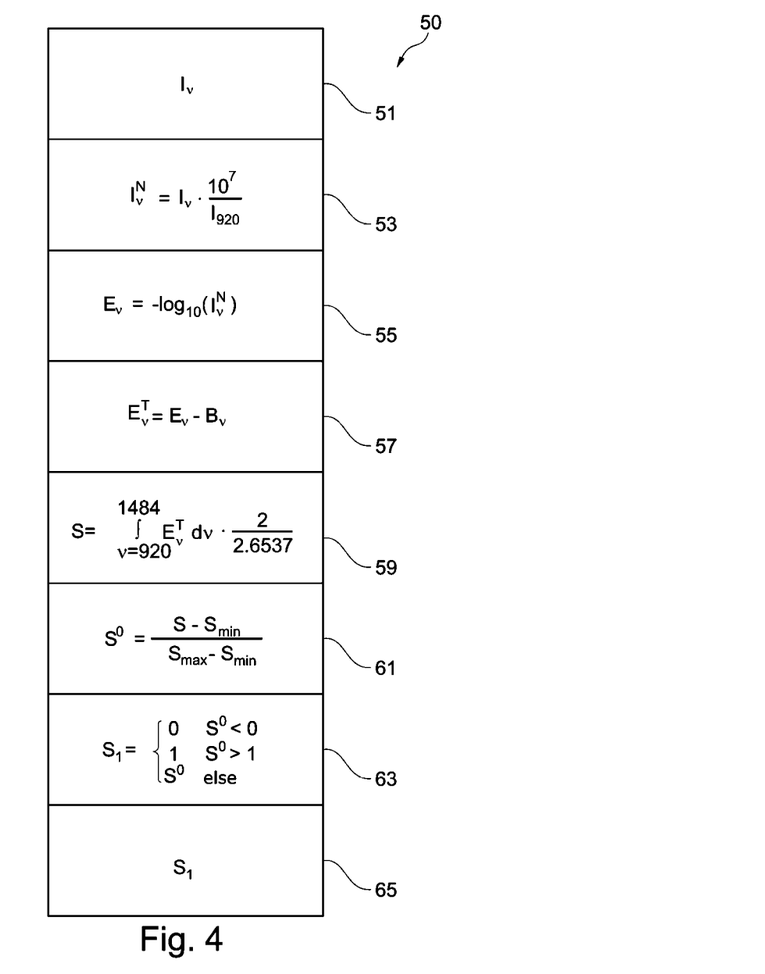
FIG. 4 schematically illustrates a method for determining an impairment of a surface which is exposed to measuring radiation during the IR-spectroscopy, according to embodiments of the present invention.

FIG. 4 schematically illustrates a method 50 for determining an indicator of an impairment of a surface which is exposed to measuring radiation during the IR-spectroscopy or spectroscopy. At first, in a method step 51, an IR-reference spectrum $I_v$ of high-purity water as an example of a reference sample is measured. In a further method step 53, the reference spectrum $I_v$ is normalized to calculate a normalized reference spectrum $I_v^N$. The reference spectrum is divided by the intensity at the wave number 920 cm$^{-1}$ and is multiplied by the factor 10$^7$. In a further method step 55, the normalized reference spectrum $I_v^N$ is logarithmized to obtain a logarithmized reference spectrum $E_v$. In a further method step 57, a temperature compensation of the logarithmized normalized reference spectrum is performed to obtain a temperature compensated reference spectrum $E_v^T$. A baseline correction with a linear function $B_v$ is performed by subtracting this linear function $B_v$ from the logarithmized normalized reference spectrum $E_v$. It holds that $B_v=k*v+d$, wherein $B_v=E_v$ is set for v=920 and 1844 cm$^{-1}$ to determine the parameters k and d in the linear function.

In a further method step 59, the above already mentioned integration is performed over the predetermined integration range 33, namely the integration of the temperature compensated logarithmized normalized reference spectrum $E_v^T$.

In a further method step 61, the value of the integration S from step 59 is normalized to obtain a normalized integration value $S^0$. $S_{max}$ may e.g. be set to 60 and $S_{min}$ may be set to −165, to obtain $S^0$. In a further optional method step 63, a cutting of the normalized integration value $S^0$ to the range which is relevant in praxis is further performed to obtain the severed normalized integration value $S_1$. According to an embodiment of the present invention, the result $S_1$ in the method step 65 constitutes the indicator for the pollution of the surface 13 and/or 15 of the ATR-crystal 11.

The display device 5 which is illustrated in FIG. 1 is configured to indicate the indicator, e.g. indicator $S_1$, to the user in an acoustic or optical manner.

The method step 51 illustrates a measuring of the IR-reference spectrum and the method steps 53, 55, 57, 59, 61, 63 illustrate the evaluating of the reference spectrum which is captured in the method step 51, to determine the indicator of the impairment of the surface 13 and/or 15.

By the evaluation of the spectrum 31 (see FIG. 3) with the algorithm illustrated in FIG. 4, it can be concluded to the pollution of the surface. From a measured reference spectrum of high-purity water, the cleaning parameter is determined. At this numerical value, a user can recognize if a cleaning is to be performed or not. The measurement of the reference sample results the IR-reference spectrum (i.e. in intensity as a function of the wave number and wavelengths, respectively). Normalizing can be performed to the intensity value at 920 cm$^{-1}$. Inclusions of the radiation source can be removed by calculation and compensated, respectively. In the temperature compensation, a baseline is subtracted which is a straight line which is laid through the points 920 cm$^{-1}$ and 1844 cm$^{-1}$. The wave numbers have been selected such that they are not in a rotation band of the water vapor spectrum. Subsequently, it is integrated over the predetermined spectral integration range, namely from 920 cm$^{-1}$ to 1484 cm$^{-1}$. According to experience, this wavelength interval may characterize a spectral range in which the spectrum significantly changes due to a pollution. The result of the integral may be positive or negative. Furthermore, it is normalized by two empirically determined values $S_{min}$ and $S_{max}$ and further a capping is performed. The result 0 may indicate a clean surface, the result 1 may indicate a highly polluted surface and a value in between may indicate a degree of a pollution. Thus, also the degree of the pollution can be quantified to be enabled to output a cleaning proposal in an improved manner.

IR-spectrometers and their sample receptacle, respectively, may be contaminated by samples, which has negative influences on the measuring result. However, a permanent invitation for cleaning to a user may be irritating and is not mandatory, but may result in an increased time effort and unnecessary wearing of components.

According to embodiments of the present invention, the user is only invited to perform a cleaning when it is actually necessary. Thereby, superfluous cleanings can be avoided, and it also reduces signs of wear which e.g. may occur by chemical cleaning agents at relevant surfaces.

On the other hand, by quantitatively indicating the pollution, it may also be avoided that, despite a present pollution, further samples are measured with the consequence that the measuring results are unreliable and erroneous, respectively. Additionally, in conventional methods, the properties of the samples to be examined are not completely considered and the number of the necessary cleanings may be overestimated and underestimated, respectively. This may lead to a considerable additional effort and, when aggressive cleaning agents are used, to the damage of components, respectively.

Embodiments of the present invention display a degree of pollution as a simple numerical value between 0 and 1, for example in steps of 0.1. The numerical value may e.g. be displayed by color or in another way. In this way, a clear and simple message can be transmitted to a user. For determining this degree of pollution or indicator, a measurement of the water spectrum (i.e. IR-reference spectrum) is transformed to the desired display by means of mathematical operations. Basically, the estimation of the pollution is based on the interpretation of the recorded water spectrum. A simultaneous reference measurement of a clean system is not necessary, also not a measurement of the initial state of the system. Trends which occurred over time, which are not caused by the pollution, are removed by calculation from the information which is contained in the spectra.

According to embodiments of the present invention, a cleaning is suggested such that the range of the indicator between 0 and 1 is not left. For example, it shall be suggested that it is cleaned sufficiently but not unnecessarily. A quantification of the degree of pollution may be performed e.g. without a necessary simultaneous reference measurement of a "clean channel". A single encoded display (e.g. by color) may be provided to quantify a pollution of the ATR-cell, to demonstrate the necessity of a cleaning. A gentle and targeted cleaning suggestion which is based on the indicator may be output to the user.

Figure 5:
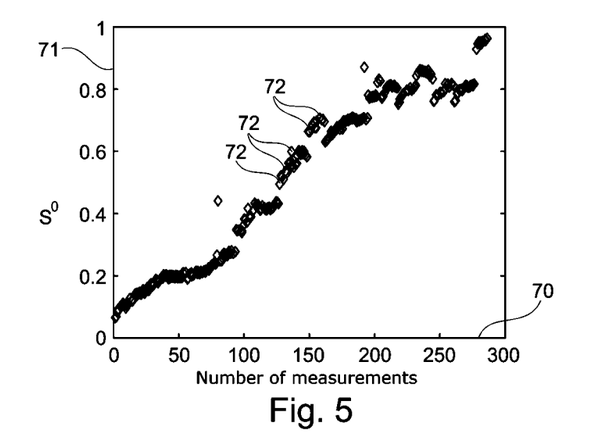
FIG. 5, FIG. 6 and FIG. 7 illustrate an indicator of a pollution of a surface as determined according to embodiments of the present invention.
Figure 6:
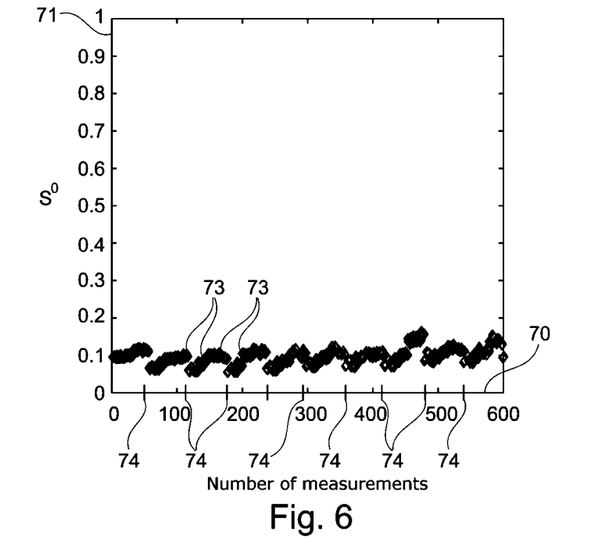
Figure 7:
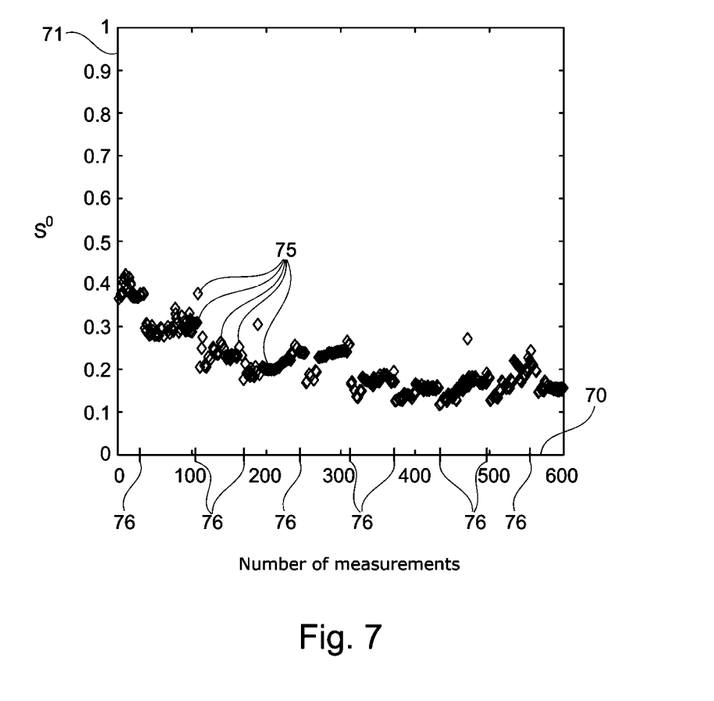

FIGS. 5, 6, 7 illustrate in an exemplary manner coordinate system normalized integration values $S^0$ (as ordinate 71) as single measuring points, wherein respectively the abscissa 73 presents the number of the measurements. In FIG. 5, measuring points 72 in continuous measurements without an effective cleaning are illustrated. As can be seen, the normalized indicator $S^0$ increases with the number of the measurements (on the abscissa 70) as it is expected at a continuous use of the measuring cell and the relevant surface, respectively.

The normalized pollution parameters $S^0$ which are illustrated in FIG. 6 are shown as points 73, wherein at the positions 74 respectively cleanings have been performed, whereupon the indicator 73 was rapidly reduced, also as expected due to the cleaning.

In FIG. 7, the surface was initially in a polluted state and at the positions 76, cleanings have been performed. The pollution indicators 75 calculated therefrom are reduced after each cleaning, as expected.

It should be noted that the term "comprising" does not exclude other elements or steps and the article "a" or "an" does not exclude a plurality. Also, elements described in association with different embodiments may be combined.

Implementation of the invention is not limited to the preferred embodiments shown in the figures and described above. Instead, a multiplicity of variants is possible which variants use the solutions shown and the principle according to the invention even in the case of fundamentally different embodiments.

The invention claimed is:

1. A device for IR-spectroscopy and for determining an impairment of a surface which is exposed to measuring radiation during the IR-spectroscopy, the device comprising:
   a radiation source to generate the measuring radiation;
   a sample receptacle for receiving a sample, wherein the sample receptacle is at least partially delimited by the surface;
   a detector for detecting measuring radiation after interaction with the sample; wherein the device is configured:
   to measure an IR-reference spectrum of a reference sample which is received in the sample receptacle, wherein the reference sample encompasses high-purity water;

to evaluate the reference spectrum to determine an indicator of the impairment of the surface,
wherein evaluating encompasses an integration of a quantity which is based on the reference spectrum over a predetermined integration spectral range,
wherein the indicator is determined dependently on a value of the integration.

2. The device according to claim 1, wherein the predetermined integration spectral range is between 800 cm$^{-1}$ and 2000 cm$^{-1}$, wherein the indicator quantitatively indicates a degree of a pollution of the surface.

3. The device according to claim 1, wherein the reference spectrum encompasses an indication:
of a measured intensity of the reflection of measuring radiation from the surface or
a measured intensity of the transmission of measuring radiation through the surface inclusively the reference sample for different wave numbers and wavelengths, respectively, wherein the measuring radiation encompasses wavelengths in a range from 2 to 12.5 µm.

4. The device according to claim 1, wherein evaluating encompasses:
normalizing the reference spectrum to obtain a normalized reference spectrum, wherein for this purpose the measured reference spectrum is divided by the intensity at a predetermined wave number and/or multiplied by a predetermined factor; and/or
logarithmizing the normalized reference spectrum to obtain a logarithmized and normalized reference spectrum.

5. The device according to claim 1, wherein evaluating encompasses:
temperature compensating the logarithmized normalized reference spectrum to obtain a temperature compensated reference spectrum,
wherein the quantity which is based on the reference spectrum is proportional to the temperature compensated reference spectrum.

6. The device according to claim 5,
wherein temperature compensating encompasses subtracting a function which is linear in the wave number from the logarithmized normalized reference spectrum,
wherein two parameters which are defining the linear function are defined by equalizing the logarithmized normalized reference spectrum with the linear function at a first predetermined wave number and at a second predetermined wave number.

7. The device according to the claim 6,
wherein the first predetermined wave number is between 870 cm$^{-1}$ and 970 cm$^{-1}$, and/or
wherein the second predetermined wave number is between 1790 cm$^{-1}$ and 1900 cm$^{-1}$.

8. The device according to claim 1, wherein evaluating encompasses:
normalizing the value of the integration to obtain a normalized integration value,
wherein the indicator is determined based on the normalized integration value.

9. The device according to claim 8, wherein the normalized integration value $S^0$ is calculated according to:

$$S^0 = (S - S_{min})/(S_{max} - S_{min}),$$

wherein S is the value of the integration, $S_{min}$ and $S_{max}$ are predetermined quantities.

10. The device according to claim 8, wherein evaluating encompasses:
cutting the normalized integration value between the values zero and one to obtain the indicator.

11. The device according to claim 1,
wherein the device is configured to perform ATR-IR-spectroscopy,
wherein the surface encompasses a surface of at least one ATR-crystal and/or of an ATR-cell which is in contact with the reference sample.

12. The device according to claim 1,
wherein the device is configured to perform transmission-IR-spectroscopy,
wherein the surface encompasses an inner and/or an outer surface of a measuring cell in which the reference sample is received.

13. The device according to claim 1, further comprising:
a display device which is configured to indicate the indicator in an optical and/or acoustic manner.

14. The device according to claim 13, further configured, by means of the display device, to indicate to a user that a maintenance shall be performed, if the value of the indicator exceeds a threshold value.

15. The device according to claim 1, configured to determine the indicator without measuring and/or a comparison with a previous reference spectrum.

16. The device according to claim 1, further comprising:
a processor; and
an electronic memory which can be accessed by the processor and in which a computer program product with program instructions is stored,
wherein the processor is configured to execute the program instructions to evaluate the reference spectrum to determine the indicator of the impairment.

17. A method of determining an impairment of a surface which is exposed to measuring radiation during IR-spectroscopy, the method comprising:
measuring an IR-reference spectrum of a reference sample;
evaluating the reference spectrum to determine an indicator of the impairment, wherein evaluating encompasses an integration of a quantity which is based on the reference spectrum over a predetermined integration spectral range, wherein the indicator is determined dependently on a value of the integration,
wherein the reference sample encompasses high-purity water.

18. A computer program product with program instructions, which when executed by a processor, control or execute a method for determining an impairment of a surface which is exposed to measuring radiation, the method comprising:
measuring an IR-reference spectrum of a reference sample;
evaluating the reference spectrum to determine an indicator of the impairment,
wherein evaluating encompasses an integration of a quantity which is based on the reference spectrum over a predetermined integration spectral range,
wherein the indicator is determined dependently on a value of the integration,
wherein the reference sample encompasses high-purity water.

* * * * *